United States Patent
Bramley

[19]

[11] Patent Number: 5,906,790
[45] Date of Patent: May 25, 1999

[54] ROTATION SYSTEM FOR PRESS HEAD

[76] Inventor: Alan Bramley, Harrimans Lane, Dunkirk, Nottingham, NG7 2SD, United Kingdom

[21] Appl. No.: 08/875,017
[22] PCT Filed: Apr. 12, 1996
[86] PCT No.: PCT/GB96/00889
  § 371 Date: Jul. 14, 1997
  § 102(e) Date: Jul. 14, 1997
[87] PCT Pub. No.: WO96/32515
  PCT Pub. Date: Oct. 17, 1996

[30] Foreign Application Priority Data

Apr. 12, 1995 [GB] United Kingdom ............ 9507606
Sep. 14, 1995 [GB] United Kingdom ............ 9518793

[51] Int. Cl.$^6$ ............................................. C22B 7/04
[52] U.S. Cl. ................................... 266/205; 266/227
[58] Field of Search .................... 266/227, 205; 75/672, 414, 640, 655

[56] References Cited

U.S. PATENT DOCUMENTS

| | | | |
|---|---|---|---|
| 2,146,678 | 2/1939 | Jung | 22/130 |
| 2,217,093 | 10/1940 | Amidon | 266/37 |
| 4,003,559 | 1/1977 | Kuwano et al. | 266/204 |
| 4,057,232 | 11/1977 | Ross et al. | 266/227 |
| 4,137,073 | 1/1979 | Singleton | 75/68 R |
| 4,386,956 | 6/1983 | Roth et al. | 75/24 |
| 4,527,779 | 7/1985 | Roth et al. | 266/227 |
| 4,540,163 | 9/1985 | van Linden et al. | 266/201 |
| 4,565,572 | 1/1986 | van Linden et al. | 75/24 |
| 4,575,056 | 3/1986 | Julliard et al. | 266/227 |
| 4,772,320 | 9/1988 | van Linden et al. | 266/227 |
| 4,842,255 | 6/1989 | Innus et al. | 266/158 |
| 5,397,104 | 3/1995 | Roth | 266/227 |
| 5,439,501 | 8/1995 | Watanabe et al. | 75/313 |
| 5,599,379 | 2/1997 | Spoel et al. | 75/378 |
| 5,669,957 | 9/1997 | Roth | 75/585 |
| 5,811,056 | 9/1998 | Bramley | 266/205 |

FOREIGN PATENT DOCUMENTS

| 406049550 | 2/1994 | Japan . |
|---|---|---|
| WO 96/32513 | 10/1996 | WIPO . |
| WO 96/32514 | 10/1996 | WIPO . |

Primary Examiner—Scott Kastler
Attorney, Agent, or Firm—Reese Taylor

[57] ABSTRACT

An incremental rotational system for an aluminium dross processing head includes lever means actuated by the head as it rises to rotate the head by a defined amount, no independent drive system being required.

12 Claims, 3 Drawing Sheets

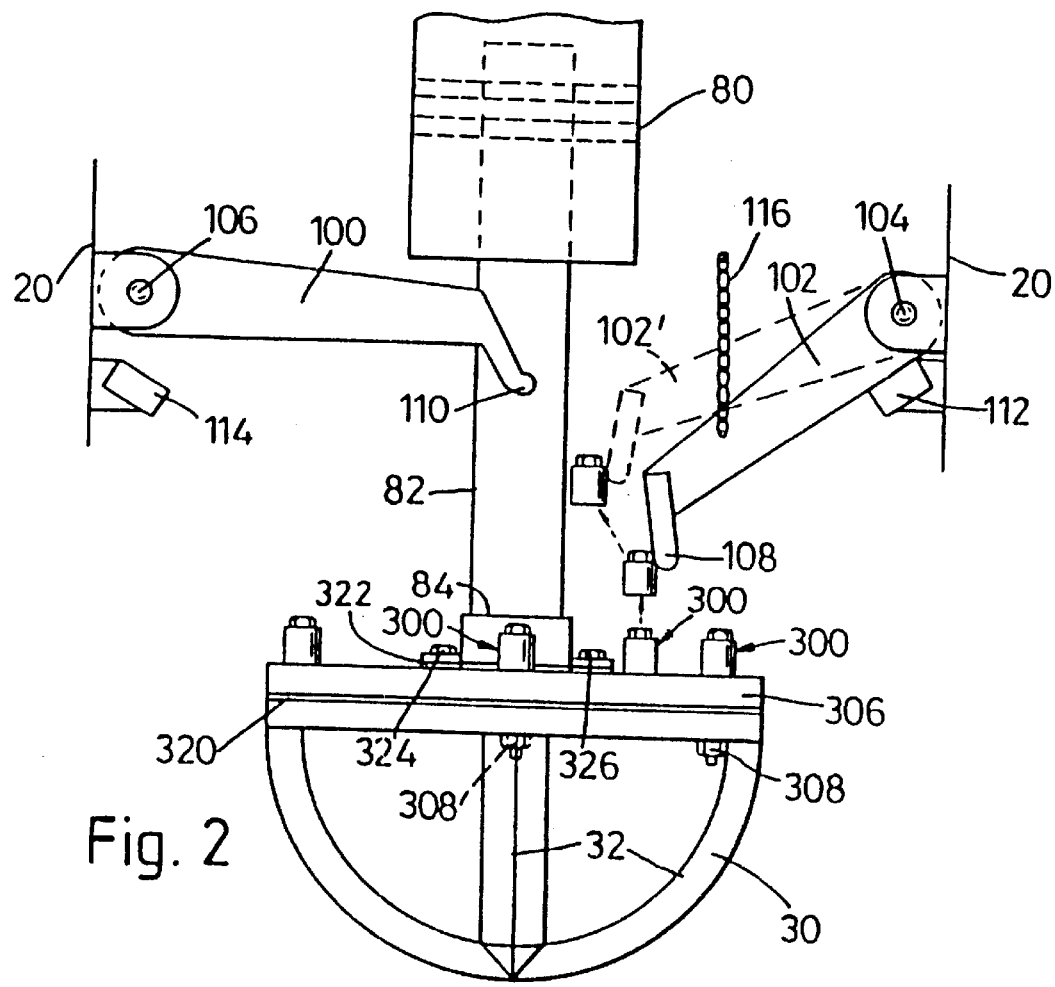
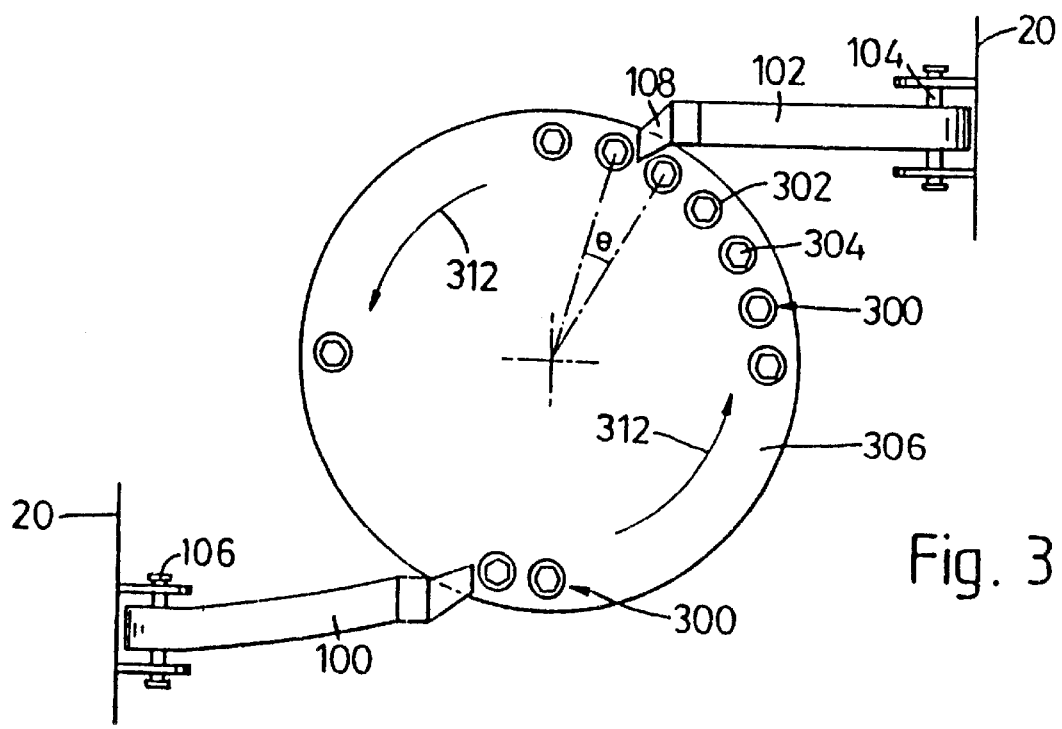

ROTATION SYSTEM FOR PRESS HEAD

RELATED PATENT APPLICATIONS

This application is based on PCT Application GB96/00889 filed Apr. 12, 1996.

BACKGROUND OF THE INVENTION

The present invention relates to press heads and more particularly to a rotating system for a press head for pressing aluminium dross.

BRIEF SUMMARY OF THE INVENTION

In any aluminium furnace system a substantial amount of dross is produced and this dross can contain a large amounts of pure aluminium which is trapped in the dross. This aluminium can be released by mechanical action on the dross.

A system for mechanically pressing dross comprises a press head which is raised and lowered and acts on dross contained in a skim box the aluminium thus released being drained through a hole in the floor of the skim box into a press sow mould.

The press head generally comprises a semispherical shape which has a plurality of ridges thereon to increase pressure on the dross as the head is raised and lowered onto the dross.

It is advantageous to be able to incrementally rotate the head during processing since this will alter the position at which the ridges press on to the dross. Since the ridges exert greater localised pressure on the dross the rotation will incrementally change the positions at which such additional pressure is exerted on the dross.

The environment within the cabinet in which the dross processing is carried out is extremely hazardous. The dross is at a high temperature and emits fumes which are contained within the cabinet or exhausted to an afterburner or fume treatment plant. The machinery within the cabinet therefore gets extremely hot.

U.S. Pat. No. 5,397,104 discloses rotation of a dross press head using application of hydraulic pressure.

It is an object of the present invention to provide an incremental rotating system for an aluminium dross processing head which is extremely robust and which is economical in operation.

The present invention provides an incremental rotation system for an aluminium dross processing head including mechanical lever means for engaging with the head as the head moves up and down said means causing the head to rotate by a defined amount.

Preferably the mechanical lever means comprises of one lever or two opposed levers each opposed lever having a pivot and an actuating end the actuating end being shaped to engage with the head to cause the head to rotate as the head moves upwardly.

Preferably the levers are attached directly or indirectly to opposite sides of a cabinet within which the dross processing apparatus is contained.

Preferably the head is provided with a plurality of circumferentially arranged bosses which are engaged by the actuating end of each lever to cause the incremental rotation. The length of the levers and the spacing between each boss is selected to cause each lever to engage successively with adjacent bosses to cause continuous incremental rotation of the head.

Preferably the levers are made sufficiently heavy to return to a lowest position by their own weight. Alternatively they can be spring loaded to return to their lowest position.

Preferably the bosses on the head are provided by collars mounted onto studs or bolts, the studs or bolts serving to attach a cast semi-spherical operational portion of the head to a circular support plate.

In a particular embodiment twenty four bosses are provided.

In a preferred embodiment, a first thermal gasket means is inserted between the circular support plate and the cast portion.

A second thermal gasket means may also be provided between the circular support plate and an actuating rod for the press.

Embodiments of the present invention will now be described, by way of example with reference to the accompanying drawings in which.

BRIEF DESCRIPTION OF THE DRAWINGS

FIG. 2 shows diagrammatically in front elevation a rotational system for incrementally rotating the dross press head of FIG. 1; and FIG. 3 shows diagrammatically the system of FIG. 2 in plan view.

detailed description of the invention

With reference now to the drawings the dross pressing apparatus will include in practice many electrical electronic and hydraulic control systems. These relate to the cyclical movements of the press head in a vertical direction as indicated by arrow V. Hydraulic drives and electronic control systems for such drives are known in machinery control systems and these will not be described in detail in this application which is directed to the rotating system for the head.

Figure 1:
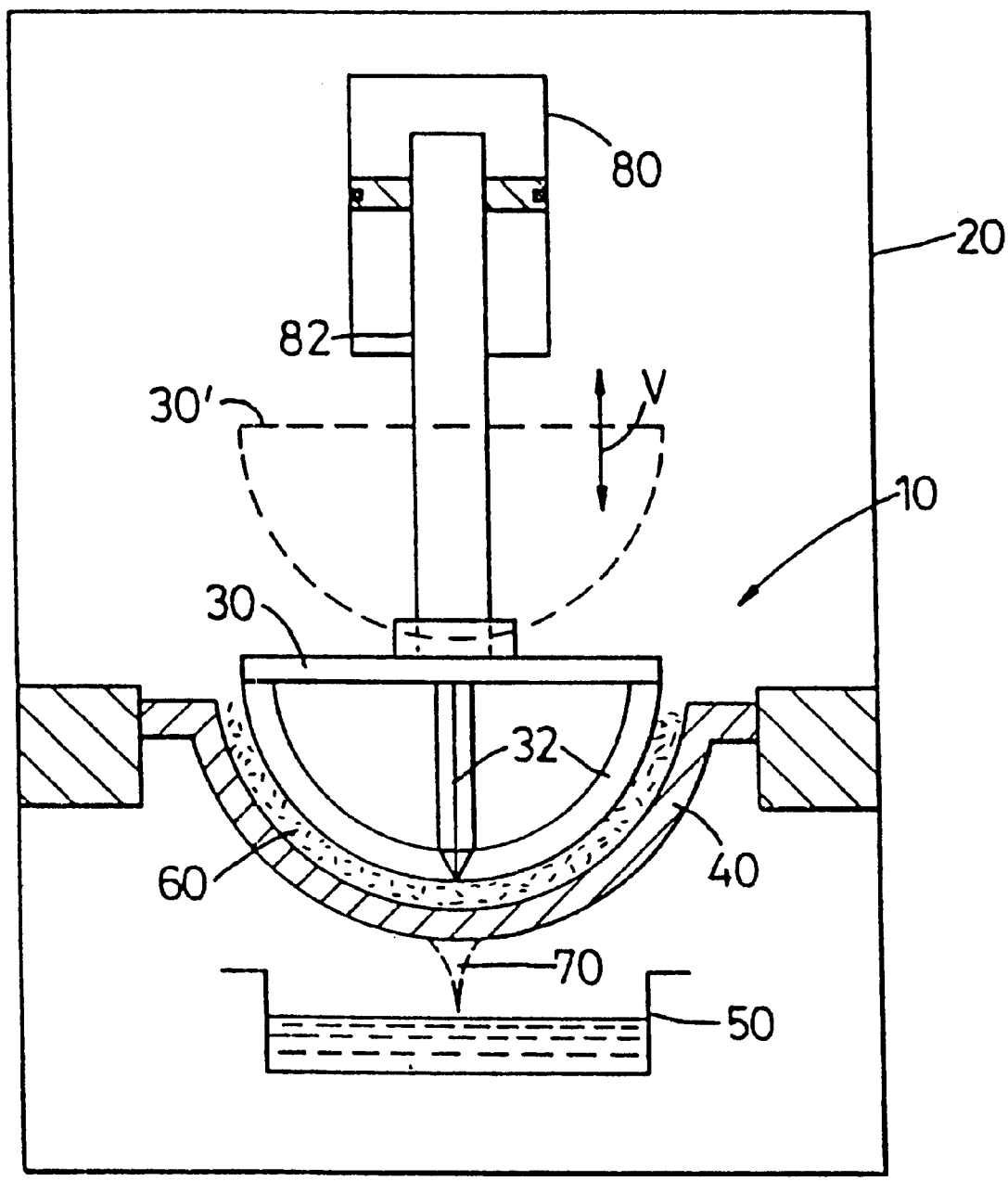
FIG. 1 shows schematically in front elevation a press for aluminium dross.

With reference to FIG. 1 the press system comprises a press 10 mounted for safety in a cabinet 20 (not shown in full detail) which for safety and environmental reasons substantially completely encloses the press 10 when it is being operated.

The press 10 comprises a press head 30, a skim box 40 and a press sow mould 50.

Aluminium dross 60 is loaded into box 40 with head 30 at its highest position 30' (dotted). The operation comprises cyclically raising and lowering head 30 onto the dross 60 to crush the dross and to release the aluminium 70 which drips from the skim box 40 into the mould 50 forming an ingot which can be later removed in a known manner.

The press head 30 is in operation cyclically moved up and down in the direction indicated by arrow V by means of a hydraulic cylinder 80 and actuating rod 82. The head 30 may comprise a plurality of ridges 32 which increase the pressure on the aluminium dross at predetermined positions.

The head 30 is normally a cast structure and is subjected to heat stress caused by repeatedly pressing the hot dross (at approximately 800° C.) and then being cooled when either not in contact with the dross or when the press is not in use. In this latter case the head 30 will cool to ambient (approximately 25° C.) and will receive a large thermal shock when commencing pressing of the dross.

It is advantageous to be able to incrementally rotate the press head and this operation will now be explained with reference to FIG. 2.

Two opposed levers 100, 102 are provided and these are shown pivotally attached at 104,106 to the cabinet walls 20 (see also FIG. 3). The levers are free to move and are not driven. Each lever 100,102 is preferably identical to the other but they could both be of different shapes as indicated by the offset design of lever 100 in FIG. 3.

At the ends of each lever 100,102 an actuating portion (108,110) is provided. Each lever 100,102 is provided with a stop means 112,114 which limits downward travel of each lever. An alternate stop means could be by a restraining chain 116 (shown only schematically for lever 102).

The lever 102 is shown in its lowermost position and the lever 100 in its uppermost position, the levers being moved between these positions by the press head 30 as it rises.

Rotation of head 30 is achieved by providing head 30 with a plurality of equispaced bosses 300 around its circumference. With reference to FIG. 3 in a preferred embodiment twenty four such bosses are provided.

As indicated in FIG. 3 the bosses comprise a collar 302 retained by a bolt 304 which bolt also serves to attach a support plate 306 to the cast head portion 30 (the internal shown nuts 308 in FIG. 2 would not be visible being within head 30).

With reference to lever 102 the rotational operation is as follows (lever 100 will operate on the opposite edge of head 30/plate 300 to assist and to balance the rotational forces).

As head 30 rises the actuating end 108 of lever 102 will contact one of the bosses 300.

As head 30 continues to rise lever 102 will move to the dotted position 102' and by this movement will push boss 300 to the left (see also FIG. 3) to rotate the head in the direction of arrow 312.

By selection of the length of levers 100,102 the incremental rotation of head 300 is made equal to the angle of arc subtended by the distance between two adjacent bosses. As the head descends it will therefore have been rotated by 15 degrees (see FIG. 3) and the ridges 32 will likewise be rotated to contact the dross in different positions.

The head 30 will then be lifted again and the process will be repeated.

In FIG. 2 a thermal gasket 320 may be provided between the cast head portion 30 and support plate 306.

If required a further thermal gasket 322 may be provided between an attachment means 84 for actuating rod 82 and plate 306. Attachment means 84 will then be bolted (324,326 etc.) to plate 306.

The gasket 320 provides a thermal shock buffer between plate 306 and head 30 and thereby assists in preventing cracking of head 30. This gasket is readily provided because plate 306 is bolted to head 30.

The gasket 320 also provides thermal isolation for plate 306, heat only being transferred via bolts 304.

If further thermal isolation is desired for actuating rod 82 and hence cylinder 80 then the further gasket 322 may be provided.

The head design shown in FIGS. 1 and 2 suffers from a number disadvantages. Principally the provision of ribs 32 which protrude from the main body of the head produces areas where thermal shock can crack the head.

Figure 4:
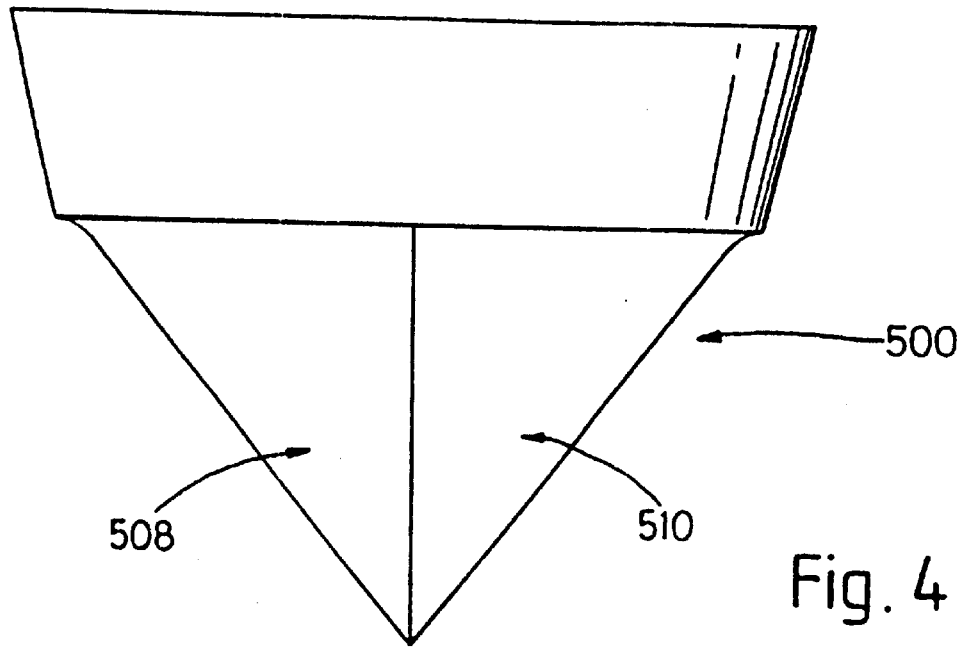
FIG. 4 shows in elevation a preferred design of press head.
Figure 5:
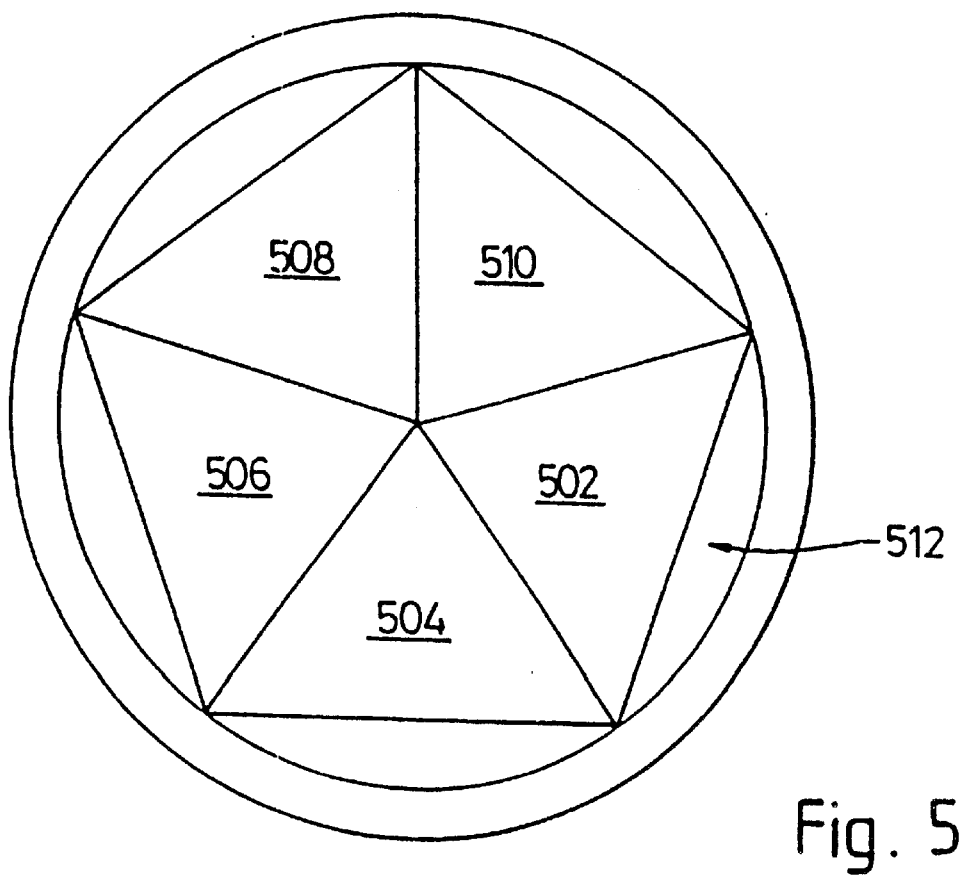
FIG. 5 shows the head of FIG. 4 in botton plan view.

In the present invention the head 500 is designed as shown in FIGS. 4 and 5 as a multi-faceted generally conical head with faces 502–510. The head preferably has five faces forming a pentagon 512.

The advantages of this head is that it can be moulded very easily and does not have any ridge as in the head of FIGS. 1 and 2. Thus this design of head is much more robust than the head of FIGS. 1 and 2 and also much easier to make. In addition the head of FIGS. 4 and 5 does not have any acute angles to trap dross and therefore is much less liable to dross sticking to the head during the pressing process.

Further since the number of facets is five in the preferred embodiment each facet subtends to an angle of 72° and the rotation of the head through an even number of steps will provide different areas of pressure on the dross.

I claim:

1. An incremental rotation system for an aluminum dross processing head including mechanical lever means for engaging with the head as the head moves up and down said means causing the head to rotate by a defined amount.

2. An incremental rotation system for an aluminum dross processing head as claimed in claim 1 in which the mechanical lever means comprises two opposed levers each opposed lever having a pivot and an actuating end, the actuating end being shaped to engage with the head to cause the head to rotate as the head moves upwardly.

3. An incremental rotation system for an aluminum dross processing head as claimed in claim 2 in which one or more levers are attached directly or indirectly to opposite sides of a cabinet within which the dross processing apparatus is contained.

4. An incremental rotation system for an aluminum dross processing head as claimed in claim 3 in which the head is provided with a plurality of circumferentially arranged bosses which are engaged by the actuating end of each lever to cause the incremental rotation.

5. An incremental rotation system for an aluminum dross processing head as claimed in claim 4 in which the length of the levers and the spacing between each boss is selected to cause each lever to engage successively with adjacent bosses to cause continuous incremental rotation of the head.

6. An incremental rotation system for an aluminum dross processing head as claimed in claim 5 in which the levers are made sufficiently heavy to return to a lowest position by their own weight.

7. An incremental rotation system for an aluminum dross processing head as claimed in claim 6 in which the levers are spring loaded to return to their lowest position.

8. An incremental rotation system for an aluminum dross processing head as claimed in claim 7 in which the bosses on the head are provided by collars mounted onto studs or bolts, the studs or bolts serving to attach a cast semi-spherical operational portion of the head to a circular support plate.

9. An incremental rotation system for an aluminum dross processing head as claimed in claim 8 in which twenty four bosses are provided.

10. An incremental rotation system for an aluminum dross processing head as claimed in claim 9 in which a first thermal gasket means is inserted between the circular support plate and the cast portion.

11. An incremental rotation system for an aluminum dross processing head as claimed in claim 10 in which a second thermal gasket means is provided between the circular support plate and an actuating rod for the press.

12. An incremental rotation system for an aluminum dross processing head as claimed in claim 1 in which the head comprises a multi-faceted generally conical structure.

* * * * *